June 23, 1964 R. C. ZEIDLER ETAL 3,138,039
VIBRATION DAMPER ASSEMBLY
Filed Aug. 17, 1962 2 Sheets-Sheet 1

Inventors:
Reinhold C. Zeidler and
Clinton V. Stromberg
By: Thomas B. Hunter Atty.

June 23, 1964 R. C. ZEIDLER ETAL 3,138,039
VIBRATION DAMPER ASSEMBLY
Filed Aug. 17, 1962 2 Sheets-Sheet 2

Inventors:
Reinhold C. Zeidler and
Clinton V. Stromberg
By: Thomas B. Hunter Atty.

United States Patent Office 3,138,039
Patented June 23, 1964

3,138,039
VIBRATION DAMPER ASSEMBLY
Reinhold C. Zeidler, Detroit, and Clinton V. Stromberg, Allen Park, Mich., assignors to Borg-Warner Corporation, Chicago, Ill., a corporation of Illinois
Filed Aug. 17, 1962, Ser. No. 217,621
2 Claims. (Cl. 74—574)

This invention concerns vibration damper assemblies, particularly heavy duty vibration dampers especially adapted for use in vehicles such as tractors and earth moving equipment, for example.

In general, the invention pertains to vibration damper assemblies of the type including a drive member in the form of a pair of annular drive plates which are adapted to transmit torque through a plurality of resilient means to a driven member in the form of a hub having an annular flange. The resilient means, in one preferred embodiment, are so arranged as to be sequentially engaged as the torque input increases. In other words, as relative movement between the drive member and the driven member is effected, a first group of resilient means is engaged. Further deflection results in a second group of resilient means being engaged, the latter preferably having a higher spring rate; and as the deflection is further increased, a third group of resilient means is engaged, said resilient means having a still higher spring rate so that a deflection vs. torque curve is similar to an exponential curve.

It is therefore a principal object of the present invention to provide a vibration damper assembly employing a series of spring damper means which are sequentially engaged as the torque input increases.

Another object of the invention is to provide novel spring retaining seats which are guided by a series of apertures in the drive plates.

Still another object of the present invention is to provide a damper assembly in which the spring means are initially preloaded within an aperture or window in the hub flange and which are guided during compression by apertures in the drive plates.

Other and more particular objects and advantages will be apparent from the following description taken in connection with the annexed drawings in which.

Figure 1:
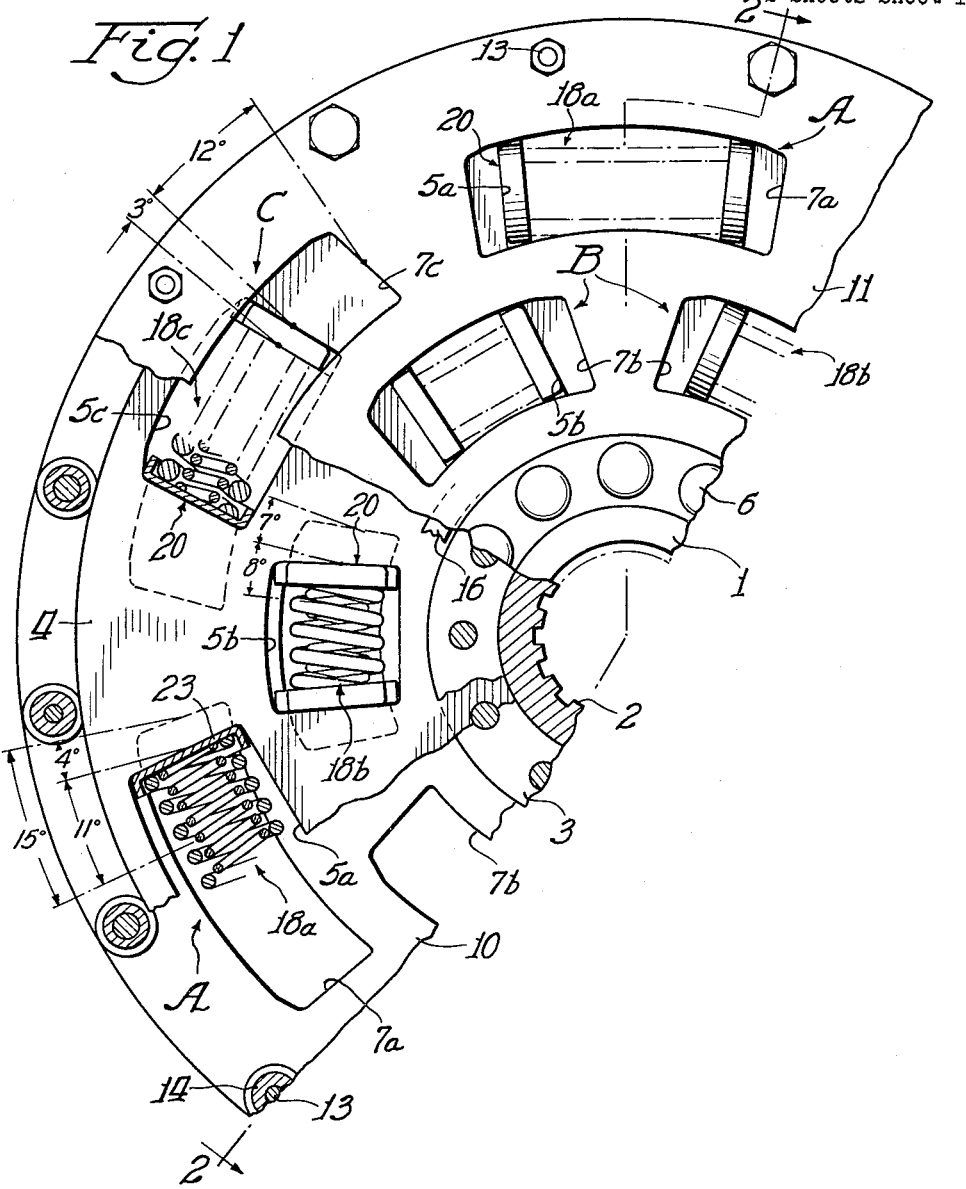
FIGURE 1 is a partial side elevation view, partly broken-away for clarity, of a damper assembly constructed in accordance with the principles of the present invention.
Figure 2:
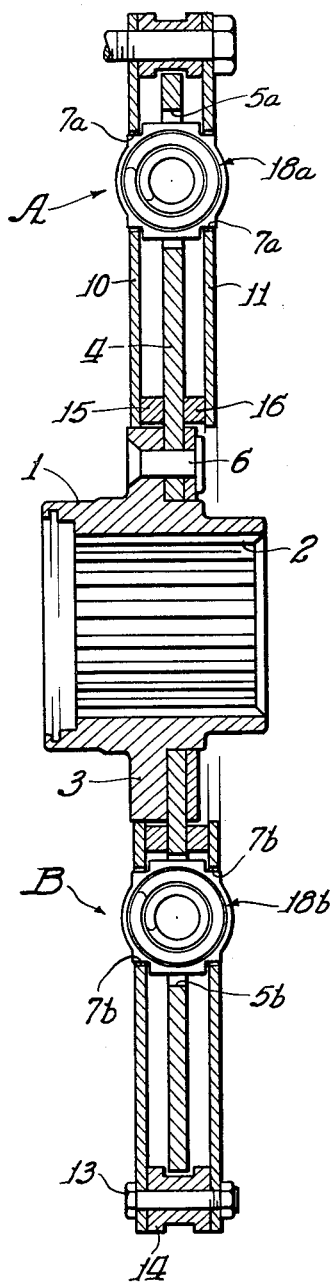
FIGURE 2 is a cross-sectional view taken along the plane of line 2—2 of FIGURE 1.

Referring now to FIGURES 1 and 2, the vibration damper assembly comprises a hub member 1 which is provided with internal splines 2 and an annular, radially extending flange 4, riveted 6 or otherwise secured to the rim portion 3 of the hub member. Although the flange is shown as secured in this manner, it should be understood that the flange 4 could be made integral with the hub or could be secured by welding or by some other suitable method.

A pair of drive or (driven) members, in the form of annular plates 10 and 11, are positioned on opposite sides of the hub flange 4. The annular members are fixedly and rigidly connected together for conjoint rotation by cap screws 13 and separated by a series of undercut spacer bushings 14, the latter permitting a hub flange of substantially larger diameter than would otherwise be allowable. Adjacent the innermost portion of annular members 10 and 11 are washers 15 and 16 which separate the radially innermost portions of said annular members from the hub flange 4. By adjusting the thickness of these washers, the damping friction can be closely controlled.

The resilient means, through which torque is transmitted from the driving member to the driven member, include a series of spring assemblies received within complementary sets of apertures provided in hub flange 4 and in the annular side plates 10 and 11. The spring assemblies and their associated sets of apertures are arranged in groups which will be designated herein as A, B, and C with a particular aperture or spring assembly being indicated as associated with a particular group by the use of a corresponding alphabetical suffix.

As best shown in FIGURE 1, each group of spring assemblies and apertures comprises one or more sets of normally registered apertures in the side plates 10, 11 and in the hub flange 4. For example, each set of apertures in group A is made up of apertures 7a, 7a in side plates 10 and 11 which normally register with an aperture 5a in hub flange 4. Similarly, the apertures 5b, 7b, and 5c, 7c form additional sets of groups B and C respectively.

Received within the aperture sets of groups A, B, and C are helical compression spring assemblies, respectively, each of, 18a, 18b, and 18c, which is supported in its operative position by spring retainer seats 20. The springs are maintained under some compression at all times between the end portions of the apertures 5a, 5b, and 5c in the hub flange 4, the length of said apertures being somewhat smaller than the fully extended length of the corresponding spring and spring retainer seat. The spring units may be of the type employing a pair of coaxially arranged or nested springs, each having a different spring rate to obtain a degree of flexibility in the selection of desirable torque-deflection characteristics for the unit.

The dimensions of corresponding apertures or windows within the same group are substantially identical, but the dimensions of corresponding apertures within different groups may be dissimilar so as to effect a sequential engagement of the spring assemblies of each said group. In the preferred embodiment, the length of each drive plate apertures 7a in group A is only slightly greater than the length of the hub flange apertures 5a so that the springs of all the sets in group A are engaged by the end portions of apertures 7a, 7a in the annular side plates 10, 11 after 4° of relative movement, it being important that there be some degree of freedom before any of the springs are engaged. After 7° of relative movement between the annular members and the hub flange, the spring seats of group B are engaged; and when the relative angular deflection has reached 12°, the springs of group C are engaged to permit a final 3° of relative movement therebetween. It should be clear from the foregoing that the total angular deflection then is 15°, and 4° of freedom are provided before any of the springs are engaged.

Figure 3:
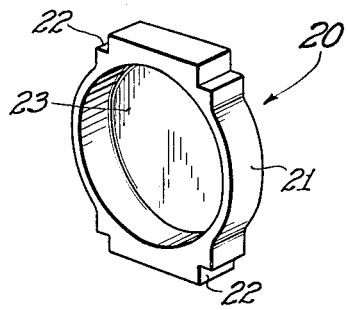
FIGURE 3 is an isometric view of a spring retaining seat.

It is an important feature of the present invention to provide a novel spring retaining seat (FIGURE 3) in each of the apertures. Spring retainer seats 20 are in the form of a generally cup-shaped body member 21 having a dimensional configuration to interlock with the apertures in annular members 10 and 11. Each said spring retaining seat is provided with four inverted notches 22 at each corner thereof, an end wall 23 having a concave face engaging and seating the springs, and an opposed, convex face adapted to engage the ends of the apertures in the annular members 10 and 11. The spring seats are guided and maintained in an operative position by virtue of the fact that the notches 22 ride within the apertures in the annular members 10 and 11.

Normally, the springs are preloaded by compression between opposite ends of the apertures 5a, 5b, and 5c in the hub flange 4. As torque is applied, the side plates rotate relative to the hub plate until the ends of the apertures in the side plates engage the ends of the spring seats. As the relative angular deflection increases, the springs compress to provide the damping effect to the assembly.

Figure 4:
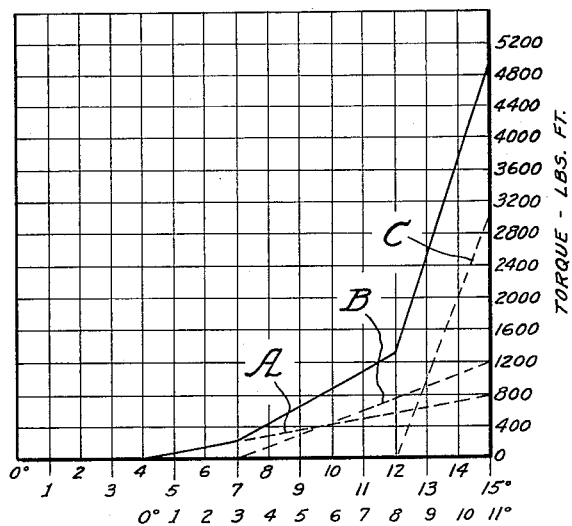
FIGURE 4 is an exemplary graph in which the relative angular deflection is plotted against the torque input in foot-pounds.

From the foregoing description it is obvious that there has been provided an improved vibration damper assembly having a spring seat which permits changing of the spring characteristics by substitution of different springs without changing the spring seats. Also, this arrangement allows for considerable latitude by permitting the use of springs having different loads and rates in various combinations to obtain unusual load deflection curves from the damper assembly, as illustrated in FIGURE 4.

While we have described our invention in connection with one specific embodiment thereof, it is to be understood that this is by way of illustration and not by way of limitation and the scope of our invention is defined solely by the appended claims which should be construed as broadly as the prior art will permit.

What is claimed is:
1. A vibration damper assembly comprising:
   a hub member having an annular, radially extending flange;
   a pair of annular members, said annular members being disposed on opposite sides of said flange;
   means connecting said pair of annular members together for conjoint rotation;
   means defining at least two aperture sets in said dampers assembly, each said aperture set including means defining an aperture in said flange and means defining apertures in each of said annular members, the apertures forming each set being normally registered to accommodate a resilient assembly through which torque may be transmitted from said annular members to said flange; and
   a resilient assembly supported within each of said flange apertures in a slightly preloaded condition, each said resilient assembly including retaining seats guided by the apertures in said annular members and engageable with said last-named apertures as said annular members are rotated relative to said flange, the respective lengths of the resilient assemblies and apertures in different aperture sets being constructed so that at least two different resilient assemblies are sequentially engaged and said annular members are free to rotate relative to said flange, prior to engagement of any said resilient assemblies.

2. A vibration damper assembly as defined in claim 1 wherein each said retaining seat comprises a cup-shaped body member having a marginal portion provided with inverted notches engaging the edges of the apertures in said annular members, whereby said retaining seats are guided and maintained in an operative position during relative rotation between said hub flange and said annular members.

References Cited in the file of this patent
UNITED STATES PATENTS

| | | |
|---|---|---|
| 2,127,996 | Havill | Aug. 23, 1938 |
| 2,513,379 | Thelander | July 4, 1950 |
| 2,636,363 | Nutt | Apr. 28, 1953 |
| 2,920,733 | Lysett | Jan. 12, 1960 |